United States Patent
Shaffer et al.

(10) Patent No.: US 7,457,287 B1
(45) Date of Patent: Nov. 25, 2008

(54) SYSTEM AND METHOD FOR ASSIGNING CALL PRIORITY

(75) Inventors: Shmuel Shaffer, Palo Alto, CA (US); Arijit Mukherji, Sunnyvale, CA (US); Labhesh Patel, Mountain View, CA (US); John F. Wakerly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1376 days.

(21) Appl. No.: 10/039,157

(22) Filed: Dec. 31, 2001

(51) Int. Cl.
*H04L 12/56* (2006.01)
(52) U.S. Cl. .................................................. 370/389
(58) Field of Classification Search .............. 370/351, 370/352, 353, 354, 355, 392
See application file for complete search history.

(56) References Cited

U.S. PATENT DOCUMENTS

| | | | | |
|---|---|---|---|---|
| 5,387,905 A * | 2/1995 | Grube et al. | ................ | 370/329 |
| 5,570,411 A * | 10/1996 | Sicher | ........................ | 455/450 |
| 5,729,542 A * | 3/1998 | Dupont | ........................ | 370/346 |
| 5,862,485 A * | 1/1999 | Linneweh et al. | ........... | 455/450 |
| 6,055,564 A | 4/2000 | Phaal | ........................ | 709/207 |
| 6,067,457 A * | 5/2000 | Erickson et al. | ............. | 455/512 |
| 6,188,882 B1 | 2/2001 | Tarkiainen et al. | .......... | 455/404 |
| 6,564,066 B1 * | 5/2003 | Biggs et al. | ................. | 455/512 |
| 6,566,651 B2 * | 5/2003 | Baba et al. | ................... | 250/281 |
| 6,600,914 B2 * | 7/2003 | Uhlik et al. | ............. | 455/404.1 |
| 6,745,043 B1 * | 6/2004 | Lester et al. | ................. | 455/512 |
| 6,977,898 B1 * | 12/2005 | Miriyala | ..................... | 370/236 |
| 7,023,802 B2 * | 4/2006 | Kawahata et al. | ........... | 370/235 |
| 7,215,744 B2 * | 5/2007 | Scherer | ................... | 379/88.19 |
| 7,333,496 B1 * | 2/2008 | Patel et al. | ............. | 370/395.42 |
| 2001/0014095 A1 * | 8/2001 | Kawahata et al. | ........... | 370/392 |
| 2002/0150082 A1 * | 10/2002 | Celi, Jr. | ...................... | 370/352 |
| 2003/0063714 A1 * | 4/2003 | Stumer et al. | ................. | 379/37 |
| 2004/0109413 A1 * | 6/2004 | Hierholzer et al. | ......... | 370/230 |
| 2005/0152346 A1 * | 7/2005 | Robenko et al. | ............ | 370/352 |

FOREIGN PATENT DOCUMENTS

| | | |
|---|---|---|
| GB | 2 290 678 A | 1/1996 |
| GB | 2 346 503 A | 8/2000 |
| WO | WO 00/11879 | 3/2000 |
| WO | WO 00/56094 | 9/2000 |

OTHER PUBLICATIONS

PCT/US 02/ 39404 Search Report mailed Mar. 31, 2003 (9 pages).

* cited by examiner

*Primary Examiner*—Anh-Vu H Ly
(74) *Attorney, Agent, or Firm*—Baker Botts L.L.P.

(57) ABSTRACT

A method and system for providing destination-based call priority includes receiving a request to establish a connection to a dialed number. A priority for the connection is determined based on the dialed number. The connection is established based on the priority.

48 Claims, 2 Drawing Sheets

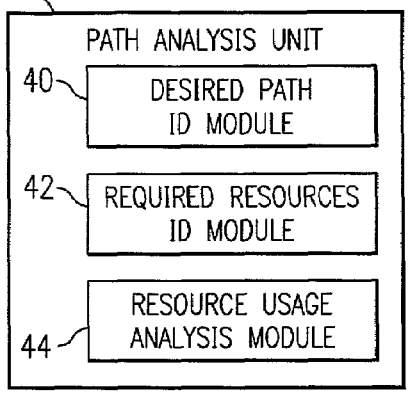
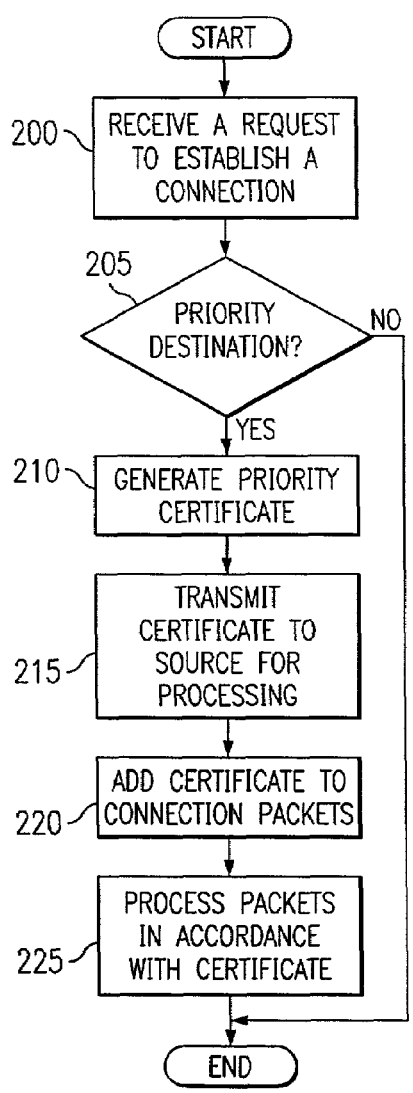
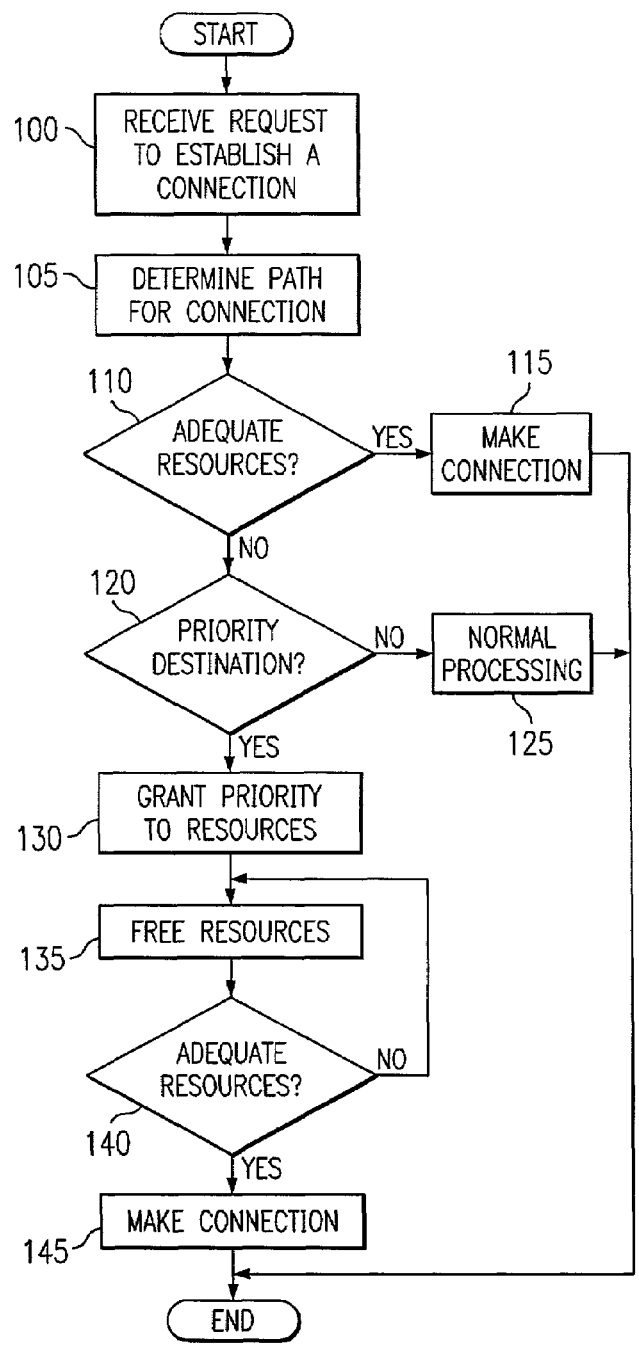

SYSTEM AND METHOD FOR ASSIGNING CALL PRIORITY

TECHNICAL FIELD OF THE INVENTION

The present invention relates generally to telecommunications systems and, more particularly, to a system and method for assigning call priority.

BACKGROUND OF THE INVENTION

Historically, telecommunications have involved a transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a Local Area Network (LAN) or a Wide Area Network (WAN).

Currently, telecommunications and data transmissions are being merged into an integrated communication network using technology such as Voice-over internet Protocol (VoIP). Since many LANs and WANs transmit computer data using Internet Protocol (IP), VoIP uses this existing technology to transmit voice and fax signals by converting these signals into digital data and encapsulating the data for transmission over an IP network.

Many VoIP networks employ Class of Service (CoS)/Quality of Service (QoS) distinctions to route traffic through the network. CoS generally refers to partitioning the network traffic into prioritized groups. QoS generally refers to buffering and queuing traffic from endpoint to endpoint, ensuring a particular throughput level. Thus, CoS/QoS is a source-based priority assignment. Callers with a higher CoS/QoS ordinarily receive preferential treatment.

SUMMARY OF THE INVENTION

The present invention provides a system and method for assigning call priority that substantially eliminate or reduce the problems and disadvantages associated with previous systems and methods. In a particular embodiment, call priority is assigned, and thus communications network resources are allocated, based on the call destination.

In accordance with a particular embodiment of the present invention, a method and system for assigning call priority includes receiving a request to establish a connection to a dialed number. A priority for the connection is determined based on the dialed number. The connection is established based on the priority.

In accordance with another embodiment of the present invention, a method and system for assigning call priority includes receiving a request to establish a connection to a dialed number. A call set-up packet is generated, a priority certificate is generated based on the dialed number, and the call set-up packet is transmitted with the priority certificate. Network resources are allocated in accordance with the priority as transmitted via the priority certificate. Requested connections with higher priorities may preempt other connections or be queued for priority access to network resources as they become available. Additionally, network users may be notified that a high-priority connection is being attempted and requires the resources the users are consuming.

A technical advantage of the present invention includes providing a method and system for assigning destination-based call priority. In particular, requests for connection in a communications network are allocated resources in accordance with the assigned priority of the target destination of the connection request. Accordingly, calls to higher priority destinations are granted greater access to network resources, ensuring that important calls are not blocked by a lack of needed network resources.

Another technical advantage of the present invention includes providing a method and system for allocating resources in a communications network. In particular, requests for connection are assigned a priority certificate corresponding to a priority of the destination recalled. Accordingly, network resources may be allocated to calls to higher-priority destinations, while calls to lower-priority destinations may be downgraded or preempted entirely. Thus, important calls, such as calls to emergency numbers, are granted a higher-priority access to network resources, resulting in a higher probability that important calls will connect in a timely manner.

Additional technical advantages include: ensuring resources for emergency calls; eliminating the need to keep dedicated resources for emergency calls; identifying the path that a high priority call is configured to take and pinpointing resources that must be reclaimed to connect the high priority call; providing notification to low priority callers before preempting their bandwidth reservations; providing notification to low priority callers before preempting their calls and taking over their trunks; and providing a centralized server to control the overall priority settings in the system.

It will be understood that various embodiments of the present invention may have some, none, or all of the above and elsewhere described technical advantages. In addition, other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 2 is a block diagram illustrating details of the path analysis unit of FIG. 1 in accordance with one embodiment of the present invention;

FIG. 3 is a flow diagram illustrating a method for allocating network resources in accordance with one embodiment of the present invention; and FIG. 4 is a flow diagram illustrating a method for allocating network resources in accordance with another embodiment of the present invention.

DETAILED DESCRIPTION OF THE DRAWINGS

Figure 1:
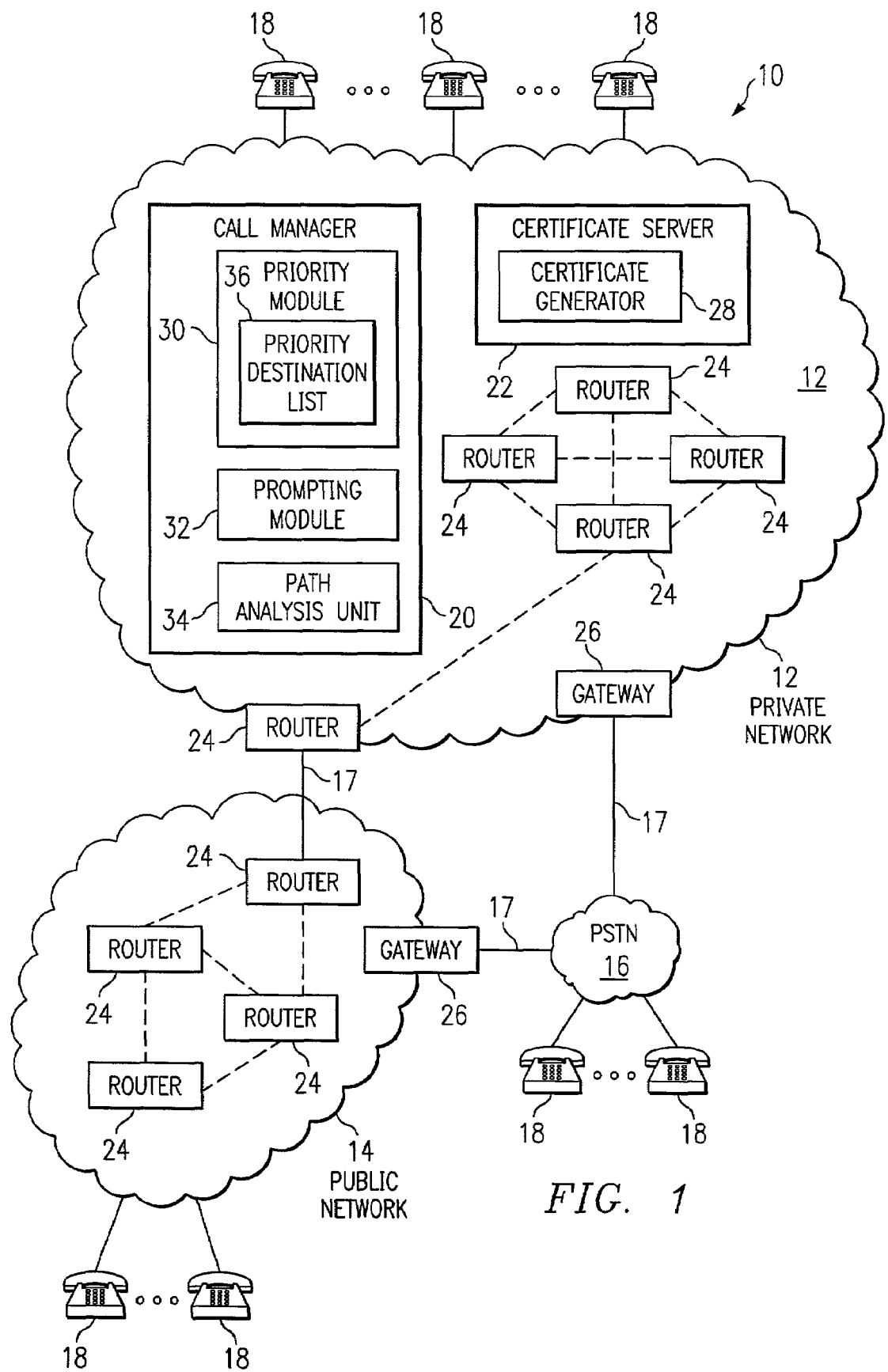
FIG. 1 is a block diagram illustrating a communication network in accordance with one embodiment of the present invention.

FIG. 1 illustrates a communications network 10 in accordance with one embodiment of the present invention. Although a specific communications network is illustrated in FIG. 1, the term "communications network" should be interpreted as generically defining any network capable of transmitting telecommunication signals, data, and/or messages.

In the illustrated embodiment, communications network 10 includes a private network 12, a public network 14, and a public switched telephone network (PSTN) 16. Private network 12, public network 14, and PSTN 16 are interconnected and coupled together via communications links 17. A plurality of terminal units 18 are coupled to private network 12, public network 14, and PSTN 16. Communications network 10 may include any computer and/or communication network or other suitable packet switched network including, but not limited to, the internet, intranets, local area networks (LANs), wide area networks (WANs) or metropolitan area networks (MANs). Communications network 10 may include twisted pair, cable, optical fiber, or other suitable wire-line links and/or radio frequency, microwave, infrared, or other suitable wireless links. Accordingly, terminal units 18 may include telephones, personal digital assistants (PDAs), computers, or any other wire-line or wireless devices capable of voice communication over a distributed network. For simplicity, and in a non-limiting manner, terminal devices 18 are shown as telephones capable of connecting with a Voice-over IP (VoIP) system. Terminal devices 18 may be identified individually as specific extensions, such as in a standard telephone communications network, or by a dialed number, or by other means to identify each terminal unit 18 as a unique unit.

Private network 12 includes a call manager 20, a certificate server 22, a plurality of routers 24, and a plurality of gateways 26. Public network 14 includes a plurality of routers 24 and gateways 26. Routers 24 are operable to provide connections between terminal units 18 along each of the private network 12 and public network 14. As used in this application, the term "each" refers to all of a particular subset. Gateways 26 are operable to communicate message traffic, for example, from private network 12, along communications link 17, to PSTN 16. Routers 24 are in communication with gateway 26 so as to provide communication from public network 14 to PSTN 16. Network 12 and/or network devices have computer processing units (CPUs), trunks, and other associated devices that process traffic based on priority. Priority may be established by priority certificates, Class of service (CoS) assignment, Quality of Service (QoS) assignment, or reserved paths.

Call manager 20 includes priority module 30, prompting module 32, and path analysis unit 34. Call manager 20 is operable to receive call setup requests and other information from terminal units 18 and set up connections so as to direct communications traffic through routers 24 to the various requested destinations including, but not limited to, internal destinations as well as destinations outside of private network 12. Call manager 20 may append a destination address to call packets sent from terminal unit 18 or may provide a destination address to terminal unit 18 during the call setup for terminal unit 18 to attach to its call packets.

Priority module 30 includes priority destination list 36. Priority module 30 is operable to determine a priority for a requested connection based on a dialed number. This determination may be made by a table lookup using the dialed number, using part of the dialed number including information associated with the dialed number, and/or determined from or by using the dialed number or other suitable means. By noting the destination terminal device 18, priority module 30 is further operable to determine a relative priority of the requested connection. This is accomplished through priority destination list 36, which includes a data set regarding the various terminal devices 18 and their relative priority as destinations for requested connections. Priority distribution list 36 is operable to maintain a table or database or otherwise suitably constructed to contain information regarding the priority of destination terminal units 18. Priority distribution list 36 may be organized by the priority of destination terminal units 18, the dialed number associated with a terminal unit 18, a combination of the two, or otherwise configured in accordance with the wishes of the network administrators. In one embodiment, the priority destination list 36 may be a table listing only the terminal devices 18 that are considered to be of high priority. Alternatively, priority destination list 36 may include a list of all terminal units 18 and a relative priority for each as a destination. Priority distribution list 36 may also include any number of terminal units 18 outside private network 12 including, but not limited to, destination terminal units 18 that are coupled directly to private network 14 or PSTN 16.

Destination terminal units 18 may be assigned priority in a variety of ways. for example, emergency calls to emergency service—such as 911—could receive highest priority, calls to high-level executives next-highest priority, and all other calls routine priority. Thus, a call to an emergency number would receive the highest priority access to network resources, and therefore would be the first to receive network resources as they become available.

Prompting module 32 is operable to communicate messages relating to the status of network services and the relative priority of calls to each of the terminal units 18 of private network 12. For example, and in a non-limiting embodiment, prompting module 32 is operable to play a recorded message to the users operating terminal units 18 that resources are needed for a high-priority call. In an alternative embodiment, prompting module 32 is operable to send a message displayed upon a screen or as a flashing light of terminal unit 18 indicating that network resources are saturated and available resources are required for a high-priority connection.

Path analysis unit 34 is operable to receive information regarding a requested connection, determine the required routers 24 and other network resources required to establish the connection, and determine which terminal units 18 are utilizing the resources required to establish a requested connection. Details of path analysis unit 34 are described in conjunction with FIG. 2.

Certificate server 22 includes certificate generator 28. Certificate generator 28 is operable to generate a priority certificate based on priority information, as will be discussed in more detail below. Certificate server 22 is in communication with call manager 20 and is operable to receive priority and other information from call manager 20 and to send a priority certificate and other information back to call manager 20. In other embodiments, certificate server 22 may also be in direct communication with each of terminal units 18. In another embodiment, certificate server 22 may also determine the appropriate priority for the connection based on the called party, performing some or all of the functionality of path analysis unit 34.

Call manager 20, priority module 30, prompting module 32, path analysis unit 34, and certificate server 22, and/or other components of private network 12 may comprise logic encoded in media. The logic comprises functional instructions for carrying out programmed tasks. The media comprises computer disks or other suitable computer-readable media, application specific integrated circuits (ASIC), field programmable gate arrays (FPGA), digital signal processors (DSP) or other suitable specific or general purpose processors, transmission media or other suitable media in which logic may be encoded and utilized.

FIG. 2 is a block diagram illustrating details of path analysis unit 34. In one embodiment, path analysis unit 34 includes desired path identification module 40, required resources identification module 42, and resource usage analysis module 44. Desired path identification module 40 is operable to receive information regarding a requested connection, and to determine a best or other suitable path through the network resources for the requested connection. For example, desired path identification module 40 may be operable to identify the routers 24 and other network resources, such as gateway 26, network trunks, and other associated network resources that a requested connection between a particular terminal unit 18 and a destination unit 18 will require. As used herein, "require" means to be allocated sufficient resources to ensure at least a minimum quality for the connection. Desired path identification module 40 is further operable to communicate the desired path to the path analysis unit 34.

Required resources identification module 42 is operable to receive information regarding the path through the network resources of a particular requested connection, and is further operable to determine which network resources are available and which network resources are currently unavailable. Once the bottleneck is identified, the required action to free resources may be calculated. Required resources identification module 42 is further operable to communicate to the path analysis unit 34 information regarding the resources required for the desired path to establish a connection as well as the presently unavailable resources required to establish that connection.

Resource usage analysis module 44 is operable to receive information regarding the desired path of a requested connection and information regarding the resources that are required, but presently unavailable, to establish the connection. Resource usage analysis module 44 is further operable to identify currently established connections using the resources required to establish a requested connection, sometimes referred to as a "bottleneck." Resource usage analysis module 44 is further operable to transmit information regarding presently established connections utilizing resources required to establish a requested connection.

While priority module 30 and path analysis unit 34 have been described as attached to call manager 20, they may be separate components attached to private network 12 or otherwise placed as required throughout the private network 12. Further information regarding the details of the present invention, and in particular the methodology by which the previously described components interact in order to provide a destination-based call priority, will be discussed in conjunction with FIGS. 3 and 4.

FIG. 3 is a flow diagram illustrating a method for assigning call priority in accordance with one embodiment of the present invention. The method begins at Step 100 where a request to establish a connection is received. This step may be performed by call manager 20 of private network 12, but in other embodiments may be performed by other components as required. Next, at Step 105, a path through private network 12 to establish the requested connection is determined. This step may be performed by path analysis unit 34 as described above in FIG. 2.

Next, at decisional Step 110, a determination is made whether adequate resources are presently available to establish the requested connection. Also at Step 110, a determination is made as to the resources required to establish the requested connection that are presently being used by other, lower-priority connections. This step also is ordinarily performed by path analysis 34 but, like Step 105, other components of private network 12 may make this determination as required or as necessary based on the particular configuration of private network 12. If sufficient resources are available to establish the connection, the process continues along the Yes branch of decisional Step 110 to Step 115 wherein the connection is established. Step 115 is ordinarily performed by call manager 20 and terminal devices 18. After establishing the connection, the process ends.

If sufficient resources are not available to establish the requested connection, the process continues along the No branch of decisional Step 110 to decisional Step 120. At decisional Step 120, a determination is made whether the destination terminal unit 18 of the requested connection is a priority destination. Step 120 is ordinarily performed by priority module 30, wherein the destination terminal unit 18 is checked against the priority destination list 36. If the destination terminal unit 18 is not a priority destination, the process continues along the No branch to Step 125. At Step 125, the ordinary processing of calls along private network 12 is performed. Such processing may include, for example, playing a busy signal to the user operating the origin terminal unit 18, queuing the connection and playing a ring signal, or other similar methods of indicating that sufficient resources are not available to establish the requested connection. After normal processing at Step 125, the process ends.

If, at decisional Step 120, it is determined that the destination terminal unit 18 is a priority destination, the process continues along the Yes branch to Step 130. At Step 130, priority is granted to the established connection to network resources. This Step may be performed by call manager 20, but may also be performed by any of the individual components of private network 12 depending on the particular network configuration. Priority may be granted to the requested connection in a variety of ways. Non-limiting examples include: increasing the priority of the call to computer processing unit (CPU) threads processing a high-priority call; increasing the priority of network voice packets relative to other packets; increasing the priority to access gateway trunks relative to other connections destined for terminal units 18 located outside of private network 12; increasing the Class of Service (CoS) or Quality of Service (QoS) parameter for the call; and increasing the priority to access network bandwidth for voice quality relative to other connections. As mentioned above, these increases in priority may be performed by call manager 20 as call manager 20 establishes the requested connection. The priority increases may also be performed by individual components of private network 12, for example at the routers 24 or gateways 26.

The process continues at Step 135 where resources are made available to establish the priority connection. The resources that are required to establish the requested priority connection, but are currently in use by other resources as determined at Step 110, are at Step 135 made available to establish the connection. In one embodiment, one or more non-priority or low-priority connections are simply preempted or terminated in order to provide resources required for the requested priority connection. In another embodiment, however, one or more existing connections may be deprived of part of their bandwidth or certain network resources without requiring that the existing connections be terminated.

Thus, in an alternate embodiment, resources may be made available for the requested priority connection without terminating any existing connections. For example, the voice quality of an existing connection may be degraded in order to free bandwidth available to establish the requested connection. Alternatively, the voice quality of the requested priority connection may be maintained at a high level, while allowing the voice quality of non-priority connections to deteriorate without terminating the non-priority connections. In another aspect of the invention, if a resource that is required to complete a high-priority call is busy, the system would queue the call for the resource. As the resource frees up, the system would allocate the resource for the high-priority call.

In still another embodiment, prompting module 32 may notify users of terminal units 18 with existing connections that a high-priority connection is being attempted and that resources are needed to establish that high-priority connection. For example, the prompting module 32 may a play pre-recorded message to the users of the terminal units 18 that are consuming resources required to establish the priority connection. That message may, for example, be phrased, "A high-priority call is being attempted. Please terminate your call as quickly as possible to free needed network resources." Or, "The voice quality of your call may deteriorate as some of the bandwidth you are using is reclaimed for an emergency related call." Or, "Your call is about to be preempted. Please terminate within five seconds." It will be readily apparent to those skilled in the art that other phrased messages may be employed depending on the network configuration and the authority of the network to reclaim resources being used. Alternatively, prompting module 32 may direct terminal units 18 to display a message or a flashing light or other means of notifying the users of terminal unit 18 that a high-priority call is being attempted and that network resources must be made available to establish that requested connection.

The process continues at decisional Step 140, wherein a determination is made whether sufficient resources are now available to establish the requested priority connection. This step may be performed by call manager 20 through path analysis unit 34, or otherwise performed by a component of private network 12. If sufficient resources are not available, the process follows the No branch, returning to Step 135, described above, wherein additional resources are made available. If adequate resources are now available to establish the connection, the process continues along the Yes branch to Step 145. At Step 145, the requested priority connection is established and the process ends. Alternatively, the requested priority connection may be placed at the front of a queue for the next available resources.

An alternative embodiment for assigning call priority is described in conjunction with FIG. 4. Referring now to FIG. 4, a method for assigning destination based call priority begins at Step 200 where a request to establish a connection is received. This step may be performed by call manager 20. Next, at decisional Step 205, a determination is made whether the destination terminal unit 18 is a priority destination. This step may be performed by priority module 30 and priority destination list 36, as discussed above. Alternatively, this step may be performed by certificate server 22. Thus, at the first leg of the call, the call goes to a priority establishment server and based on the various parameters such as caller ID, destination priority, etc., the server may attach a priority certificate to the call, as described below.

The priority destination may be determined in various ways, generally described above in connection with the priority destination list 36 and Step 120 of FIG. 3. If at decisional Step 205 the destination terminal unit 18 is not found to be a priority destination, the process ends. If, however, it is determined that the destination terminal unit 18 is a priority destination, the process continues along the Yes branch of decisional Step 205 to Step 210.

At Step 210, a priority certificate is generated according to the priority for the destination terminal unit 18, determined at decisional Step 205. This step may be performed by certificate server 22, via certificate generator 28. The certificate may be generated based on relevant priority parameters such as, for example, the identification of the user requesting the established priority connection, the relative priority of the destination terminal unit 18, and any other parameters relevant to the routing of the requested connection.

Next, at Step 215, the priority certificate generated at Step 210 is transmitted to the source requesting the priority certificate for processing. This step may be performed by certificate server 22 transmitting the priority certificate back to call manager 20 for further processing. In an alternative embodiment, the certificate server 22 may transmit the priority certificate back to the originating terminal unit 18—that is, the terminal unit 18 that requested the priority connection—or, to the call manager 20 for concatenation with a call setup packet. If the call originates from a terminal device 18 of PSTN 16, the priority certificate is sent to the gateway 26 through which the call entered the private network 12.

Next, at Step 220, the priority certificate is appended, added, or otherwise coupled to the packets associated with the requested connection. In one embodiment, the priority certificate is appended to the beginning of all packets associated with the requested connection as a prefix. Other uses for the priority certificate may be employed as required by the particular configuration of private network 12.

In an alternative embodiment, the individual terminal units 18 may be configured to perform the functions of the certificate server 22. In this embodiment, the terminal unit 18 determines the priority of the destination (Step 205), generates the priority certificate (Step 210), and attaches the certificate to the relevant communication packets associated with the requested connection (Step 220). To accomplish this feature, the list of priority destinations may be downloaded from a central depository to the endpoints as part of the bring-up of the endpoints.

Next, at Step 225, the packets associated with the requested connection are processed in accordance with the priority certificate attached to each packet. In one embodiment, only connections requested to high priority destinations receive priority certificates. In this embodiment, the components of private network 12 are configured so as to recognize the priority certificate and to allocate network resources accordingly.

In another embodiment, priority certificates are generated for each requested connection, regardless of the requested connection's relative priority, and appended to each particular call packet associated with the requested connection. In this embodiment, the network components are configured to recognize the priority certificates and allocate network resources in accordance with the relative priority indicated by the priority certificates of all network packets processed by that particular component. Thus, the various network elements, such as the routers, the PBX, the caller's phone device, the gateways, etc., can give a call its designated priority based on the certificate attached to it. The process ends when the packets are processed.

Although the methods described in connection with FIGS. 3 and 4 have been described with a particular number of steps in a particular order, the steps may be performed in any order appropriate to the network configuration. Furthermore, steps may be omitted, or additional steps added, in accordance with the requirements of the particular network.

Although the present invention has been described with several embodiments, a myriad of changes, variations, alterations, transformations, and modifications may be suggested to one skilled in the art. It is intended that the present invention encompass such changes, variations, alterations, transformations, and modifications as fall within the spirit and scope of the appended claims.

What is claimed is:

1. A method for assigning call priority in a packet switched environment, comprising:
   receiving a request from an internet protocol phone within the packet switched environment to establish a connection to a dialed number, the internet protocol phone having a wired connection to the packet switched environment;

determining a priority for the connection based on the dialed number;
generating a priority certificate based on the priority;
attaching the priority certificate to the communication packets of the connection;
establishing the connection based on the priority;
monitoring use by an end-point of connections having an augmented priority; and
modifying the priority of the connection based on the monitored end-point use of connections having an augmented priority.

2. The method of claim 1, further comprising processing the communication packets based on the priority certificate.

3. The method of claim 1, wherein the certificate provides the communication packets with a higher priority to CPU threads processing communication packets for the connection.

4. The method of claim 1, further comprising increasing the priority of network voice packets associated with the connection relative to other packets.

5. The method of claim 1, wherein the certificate provides the communication packets with a higher priority to access gateway trunks relative to other connections.

6. The method of claim 1, wherein the certificate provides the communication packets with a higher priority to access network bandwidth for voice quality relative to other connections.

7. The method of claim 1, further comprising notifying network users of a need to make resources available for a high-priority connection.

8. The method of claim 1, further comprising:
determining whether adequate resources are available for the connection to maintain a first quality of service level;
if not available, pre-empting other connections to free up resources for the connection; and
establishing the connection using the freed-up resources.

9. The method of claim 8, wherein freeing up resources comprises downgrading the quality of service parameters of the other connections.

10. The method of claim 8, further comprising notifying affected users that their connections are subject to preemption.

11. The method of claim 8, wherein determining whether adequate resources are available comprising:
determining a path for the connection; and
determining whether adequate resources are available along the path based on the first quality of service level.

12. The method of claim 1, further comprising:
determining if adequate resources are available for the connection; and
if not available, queuing the connection as first to receive resources as they become available.

13. The method of claim 1, further comprising queuing higher priority connections; and
pre-empting connections with a lower relative priority.

14. The method of claim 1, further comprising determining resources required to establish the requested connection and provide the connection with priority to the needed resources.

15. The method of claim 1, further comprising:
identifying currently established connections using resources required to establish the requested connection; and
preempting the connections using the required resources to establish the requested connection.

16. The method of claim 1, further comprising monitoring network resources to determine when sufficient resources are available to establish the requested connection.

17. A system for assigning call priority in a packet switched environment, comprising:
a means for receiving a request from an internet protocol phone within the packet switched environment to establish a connection to a dialed number, the internet protocol phone having a wired connection to the packet switched environment;
a means for determining a priority for the connection based on the dialed number;
a means for generating a priority certificate based on the priority;
a means for attaching the priority certificate to the communication packets of the connection;
a means for establishing the connection based on the priority;
a means for monitoring use by an end-point of connections having an augmented priority; and
a means for modifying the priority of the connection based on the monitored end-point use of connections having an augmented priority.

18. The system of claim 17, further comprising a means for processing the communications packets based on the priority certificate.

19. The system of claim 17, wherein the certificate provides the communication packets with a higher priority to CPU threads processing communication packets for the connection.

20. The system of claim 17, further comprising a means for increasing the priority of network voice packets associated with the connection relative to other packets.

21. The system of claim 17, wherein the certificate provides the communication packets with a higher priority to access gateway trunks relative to other connections.

22. The system of claim 17, wherein the certificate provides the communication packets with a higher priority to access to network bandwidth for voice quality relative to other connections.

23. The system of claim 17, further comprising a means for notifying network users of a need to make resources available for a high-priority connection.

24. The system of claim 17, further comprising:
a means for determining whether adequate resources are available for the connection to maintain a first quality of service level;
a means for pre-empting other connections if not available; and
a means for establishing the connection using the freed-up resources.

25. The system of claim 24, further comprising a means for downgrading the quality of service parameters of other connections.

26. The system of claim 24, further comprising a means for notifying affected users that their connections are subject to preemption.

27. The system of claim 24, wherein the means for determining whether adequate resources are available comprising:
a means for determining a path for the connection; and
a means for determining whether adequate resources are available along the path based on the first quality of service level.

28. The system of claim 17, further comprising:
a means for determining if adequate resources are available for the connection; and
a means for queuing the connection as first to receive resources as they become available, if resources are not available.

29. The system of claim 17, further comprising a means for queuing higher priority connections; and
a means for preempting connections with a lower relative priority.

30. The system of claim 17, further comprising a means for determining resources required to establish the requested connection and provide the connection with priority to the needed resources.

31. The system of claim 17, further comprising:
a means for identifying currently established connections using resources required to establish the requested connection; and
a means for pre-empting the connections using the required resources to establish the requested connection.

32. The system of claim 17, further comprising a means for monitoring network resources to determine when sufficient resources are available to establish the requested connection.

33. A system for assigning call priority in a packet switched environment, comprising:
a computer-readable medium encoded with computer executable logic; and
a computer for implementing the logic to receive a request from an internet protocol phone within the packet switched environment to establish a connection to a dialed number, the internet protocol phone having a wired connection to the packet switched environment, determine a priority for the connection based on the dialed number, generate a priority certificate based on the priority, attach the priority certificate to the communication packets of the connection, establish the connection based on the priority, monitor use by an end-point of connections having an augmented priority, and modify the priority of the connection based on the monitored end-point use of connections having an augmented priority.

34. The system of claim 33, wherein the logic is further operable to process the communication packets based on the priority certificate.

35. The system of claim 33, wherein the certificate provides the communication packets with a higher priority to CPU threads associated with the connection.

36. The system of claim 33, wherein the logic is further operable to increase the priority of network voice packets associated with the connection relative to other packets.

37. The system of claim 33, wherein the certificate provides the communication packets with a higher priority to access gateway trunks relative to other connections.

38. The system of claim 33, wherein the certificate provides the communication packets with a higher priority to access network bandwidth for voice quality relative to other connections.

39. The system of claim 33, wherein the logic is further operable to notify network users of a need to make resources available for a high-priority connection.

40. The system of claim 33, wherein the logic is further operable to:
determine whether adequate resources are available for the connection to maintain a first quality of service level;
preempting other connections to free up resources for the connection if not available; and
establish the connection using the freed-up resources.

41. The system of claim 40, wherein freeing up resources comprises downgrading the quality of service parameters of other connections.

42. The system of claim 40, wherein the logic is further operable to notify affected users that their connections are subject to preemption.

43. The system of claim 40, wherein logic is further operable to determine whether adequate resources are available comprising logic operable to:
determine a path for the connection; and
determine whether adequate resources are available along the path based on the first quality of service level.

44. The system of claim 33, wherein the logic is further operable to:
determine if adequate resources are available for the connection; and
queue the connection if not available, as first to receive resources as they become available.

45. The system of claim 33, wherein the logic is further operable to:
queue higher priority connections; and
preempt connections with a lower relative priority.

46. The system of claim 33, wherein the logic is further operable to determine resources required to establish the requested connection and provide the connection with priority to the needed resources.

47. The system of claim 33, wherein the logic is further operable to:
identify currently established connections using resources required to establish the requested connection; and
preempt the connections using the required resources to establish the requested connection.

48. The system of claim 33, wherein the logic is further operable to monitor network resources to determine when sufficient resources are available to establish the requested connection.

* * * * *